United States Patent
Kim et al.

(10) Patent No.: US 10,728,198 B2
(45) Date of Patent: Jul. 28, 2020

(54) METHODS AND APPARATUS FOR DYNAMIC LOCATION-BASED MEDIA BROADCASTING

(71) Applicant: VERI, INC., New York, NY (US)

(72) Inventors: Angela Kim, Brooklyn, NY (US); Lee Hoffman, New York, NY (US)

(73) Assignee: XO Group Inc., Chevy Chase, MD (US)

( * ) Notice: Subject to any disclaimer, the term of this patent is extended or adjusted under 35 U.S.C. 154(b) by 0 days.

(21) Appl. No.: 16/499,362

(22) PCT Filed: Mar. 30, 2018

(86) PCT No.: PCT/US2018/025545
§ 371 (c)(1),
(2) Date: Sep. 30, 2019

(87) PCT Pub. No.: WO2018/183945
PCT Pub. Date: Oct. 4, 2018

(65) Prior Publication Data
US 2020/0076754 A1    Mar. 5, 2020

Related U.S. Application Data

(60) Provisional application No. 62/479,790, filed on Mar. 31, 2017.

(51) Int. Cl.
*H04L 12/58* (2006.01)
*H04W 4/029* (2018.01)
(Continued)

(52) U.S. Cl.
CPC ........... *H04L 51/10* (2013.01); *H04L 51/20* (2013.01); *H04W 4/029* (2018.02); *H04W 4/06* (2013.01); *H04W 4/14* (2013.01); *H04L 67/22* (2013.01)

(58) Field of Classification Search
CPC ......... H04W 4/029; H04W 4/06; H04W 4/14; H04W 4/021; H04W 4/80; H04W 4/02;
(Continued)

(56) References Cited

U.S. PATENT DOCUMENTS

| | | | |
|---|---|---|---|
| 2008/0229215 A1* | 9/2008 | Baron | G06N 3/006 715/751 |
| 2013/0117365 A1* | 5/2013 | Padmanabhan | H04W 4/21 709/204 |

(Continued)

*Primary Examiner* — Magdi Elhag
(74) *Attorney, Agent, or Firm* — Pillsbury Winthrop Shaw Pittman, LLP

(57) ABSTRACT

The presently disclosed subject matter includes a system to receive, from a plurality of compute devices, a set of media files and a set of geolocations, each media file from the set of media files captured by a compute device from the plurality of compute devices and each geolocation from the set of geolocations associated with a compute device from the plurality of compute devices. The system determines an event geolocation based on the set geolocations. The system sends a request message to a compute device from the plurality of compute devices when it is determined that the compute device is departing from the event geolocation. The system receives from the departing compute device, at least one media file associated with the event and publishes, via a host server, the set of media files and the at least one media file associated with the event.

20 Claims, 20 Drawing Sheets

(51) Int. Cl.
*H04W 4/06* (2009.01)
*H04W 4/14* (2009.01)
*H04L 29/08* (2006.01)

(58) Field of Classification Search
CPC .. H04W 12/00503; H04L 51/10; H04L 51/04;
H04L 51/046; H04L 51/20; H04L 51/32
See application file for complete search history.

(56) References Cited

U.S. PATENT DOCUMENTS

| | | | |
|---|---|---|---|
| 2013/0124508 A1* | 5/2013 | Paris | G06F 16/51 707/723 |
| 2014/0143004 A1* | 5/2014 | Abhyanker | H04L 12/1859 705/7.19 |
| 2015/0006637 A1* | 1/2015 | Kangas | H04N 21/2665 709/204 |
| 2015/0039616 A1* | 2/2015 | Rolston | G06F 16/51 707/737 |
| 2015/0319197 A1* | 11/2015 | Capt | H04W 4/06 709/203 |
| 2015/0350266 A1* | 12/2015 | O'Brien | H04W 4/021 709/204 |
| 2016/0381163 A1* | 12/2016 | Mashtakov | H04L 67/1097 709/205 |
| 2017/0070358 A1* | 3/2017 | Svendsen | H04L 67/18 |
| 2018/0095960 A1* | 4/2018 | Tan | G11B 27/11 |
| 2019/0141488 A1* | 5/2019 | Yedvab | H04W 4/023 |

\* cited by examiner

1503

1501

METHODS AND APPARATUS FOR DYNAMIC LOCATION-BASED MEDIA BROADCASTING

CROSS-REFERENCE TO RELATED APPLICATIONS

This application is a U.S. National Phase of International Application No. PCT/US2018/025545, filed on Mar. 30, 2018, entitled "METHODS AND APPARATUS FOR DYNAMIC LOCATION-BASED MEDIA BROADCASTING," which claims priority, under 35 U.S.C. § 119, to U.S. Application No. 62/479,790, entitled "METHODS AND APPARATUS FOR DYNAMIC LOCATION-BASED MEDIA BROADCASTING" and filed on Mar. 31, 2017, the entirety of the aforementioned application(s) are hereby expressly incorporated by reference for all purposes.

BACKGROUND

Users frequently share content (e.g., images, video, text, and/or like content) with other users. Some known systems can allow users to share content with multiple users at once (e.g., to broadcast content). Some known systems, however, can require users to capture content on a device via one application on the device, open a second application on the device to send the content, and import and/or select the content the user would like to broadcast, all before broadcasting the content to other users. Additionally, some known systems can allow a user to use a single application to share content, but must reproduce the functionality of a native camera application of the device. Other known systems can allow users to select an audience and/or geographic range of the broadcast, but do not allow for automatic broadcasting to particular users e.g., to contacts and/or friends, and/or other limited sets of users), e.g., based on their geographic location or being present at or participating in specific events.

Accordingly, a need exists for methods and apparatus that can allow for automatic and dynamic broadcasting of content to specified groups of users, and/or in the context of specified events.

SUMMARY

In some embodiments, a broadcast mobile application can interact with a media mobile application to upload generated content, for transmission to one or more users. For example, a user can take a picture with a camera application on their mobile device, and a broadcast mobile application (e.g., running as a background process on the mobile device) can automatically detect when the camera application has obtained image data. The broadcast mobile application can automatically obtain and upload the content to a broadcast server, which can generate a broadcast object for the user, and can use the broadcast object to broadcast the uploaded content to one or more other users. In some implementations, the camera application can detect the broadcast mobile application as an application relevant for taking pictures, e.g., such as a Global Positioning System (GPS) application, and/or a similar application, and can notify the broadcast mobile application that a picture has been taken, e.g., in a similar manner as it would interact with a GPS service at the mobile device. In this manner, the user can broadcast content without manually selecting content to broadcast, and a media mobile application (e.g., such as a camera application) can automatically notify the broadcast mobile application about new content, e.g., without needing to know the nature of the broadcast mobile application, or whether or not the broadcast mobile application is running on the mobile device. Further, the broadcast mobile application can automatically and dynamically broadcast content to other users while running as a background process (e.g., without the user opening and interacting with the broadcast mobile application), allowing for use of native media capture applications (such as camera applications and/or the like) in addition to the broadcast mobile application.

DETAILED DESCRIPTION

Figure 1:
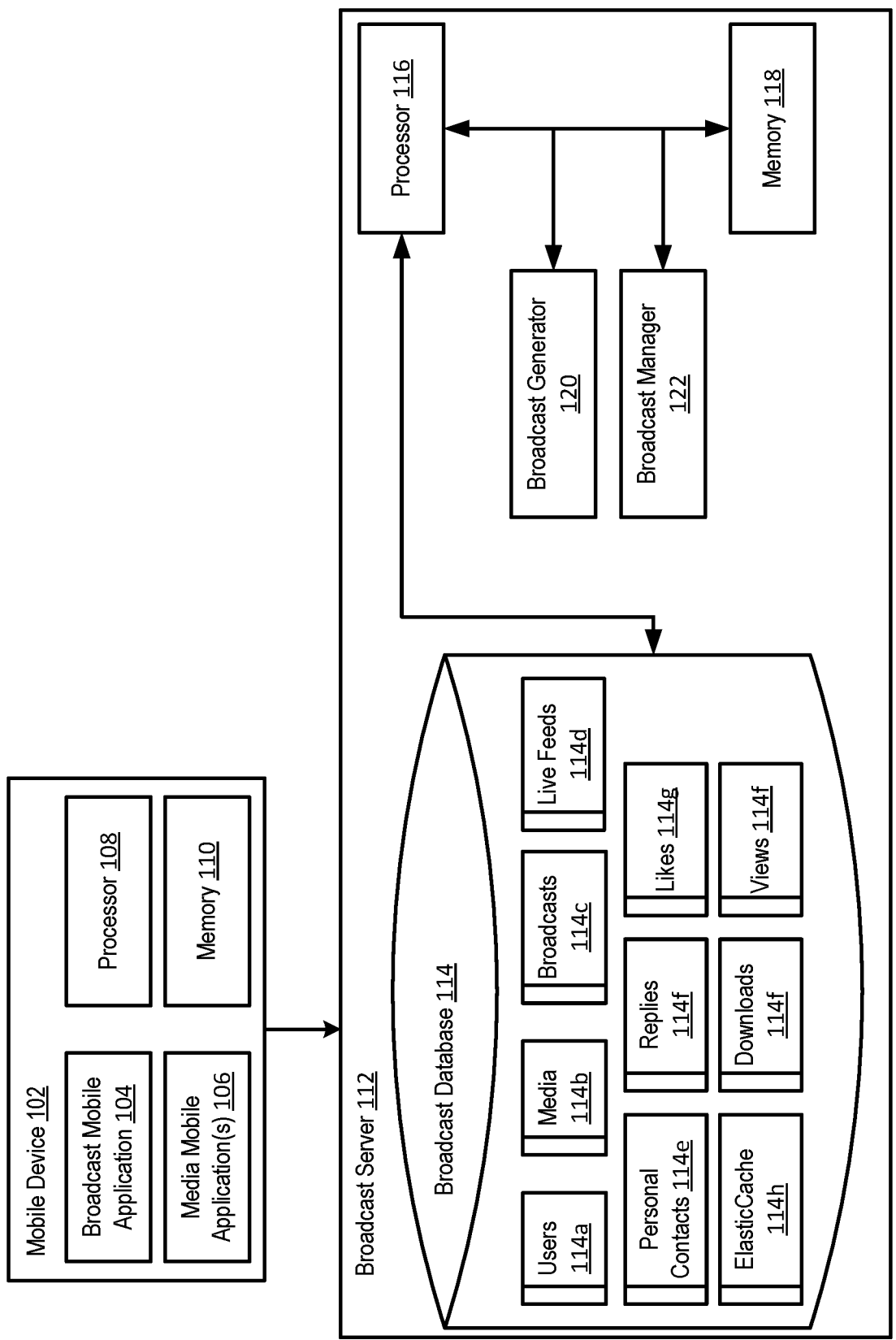
FIG. 1 is a schematic diagram illustrating a broadcast server and a mobile device, according to an embodiment.

FIG. 1 is a block diagram illustrating a user's mobile device 102 and a broadcast server 112. For example, in some implementations, a mobile device 102 can be a personal computer (e.g., a user laptop) and/or a mobile electronic device (e.g., a mobile phone, a tablet, a personal digital assistant (PDA), and/or a similar device) able to capture and/or otherwise generate content (e.g., images, videos, audio files, and/or other such media), and to send the generated content to other devices, e.g., such as the broadcast server 112. The mobile device 102 can include at least a processor 108, a memory 110, a display device for rendering email messages, and/or an input interface (e.g., a touch screen, keypad, keyboard, and/or similar interface) for inputting email message information.

The processor 108 can be a processor or processing unit configured to receive and process data, and/or to execute code representing executable instructions. In some embodiments, the processor 108 can be a general purpose processor, a Field Programmable Gate Array (FPGA), an Application Specific Integrated Circuit (ASIC), a Digital Signal Processor (DSP), or other suitable processing compute device. The memory 110 can be a hardware component configured to store data accessible by the processor 108, and/or to store code representing executable instructions for the processor 108. The memory 110 can be, for example, a random access memory (RAM), a memory buffer, a hard drive, a database, an erasable programmable read-only memory (EPROM), an electrically erasable read-only memory (EEPROM), a read-only memory (ROM) and/or the like. In some embodiments, the memory 110 can store instructions to cause the processor 108 to execute modules, processes and/or functions associated with a broadcast server 112.

The mobile device 102 can include a media mobile application 106. The media mobile application 106 can capture media. Examples of such an application include a camera application, an audio recording application, and/or a similar application for capturing other suitable media. The media mobile application 106 can be stored in the memory 110 and/or in separate data storage on the mobile device 102, and can be implemented on the processor 108, e.g., when the user selects the media mobile application 106. The mobile device 102 can also include a broadcast mobile application 104. The broadcast mobile application 104 can determine when media content has been captured at the media mobile application 106, and can automatically upload the content to the broadcast server 112. The broadcast mobile application 104 can also be stored in the memory 110 and/or in separate data storage on the mobile device 102, and can be implemented on the processor 108.

A broadcast server 112 can include at least one processor 116, at least one memory 118, and/or at least one broadcast database 114. The at least one processor 116 can be any hardware component configured to receive and process data, and/or to execute code representing executable instructions. In some embodiments, the at least one processor 116 can be a general purpose processor, a Field Programmable Gate Array (FPGA), an Application Specific Integrated Circuit (ASIC), a Digital Signal Processor (DSP), and/or the like.

The at least one memory 118 can be a hardware component configured to store data accessible by the at least one processor 116, and/or to store code representing executable instructions for the at least one processor 116. The memory 118 can be, for example, a random access memory (RAM), a memory buffer, a hard drive, a database, an erasable programmable read-only memory (EPROM), an electrically erasable read-only memory (EEPROM), a read-only memory (ROM) and/or the like. In some embodiments, the memory 118 can store instructions to cause the at least one processor 116 to execute modules, processes and/or functions associated with a broadcast server 112.

The at least one processor 116 can implement a number of server components, including but not limited to a broadcast generator 120 and a broadcast manager 122. The at least one processor 116 can be configured to execute instructions generated by any of server components, and/or instructions stored in the memory 118. In some implementations, when the broadcast server 112 includes multiple processors 116, the server components can be distributed among and/or executed by the multiple processors 116. The at least one memory 118 can be configured to store processor-readable instructions that are accessible and executable by the at least one processor 116.

In some implementations, the server components can be implemented on the at least one processor 116 (e.g., as software executed on and/or implemented by the at least one processor 116). In some implementations, server components can include software stored in the memory 118 and executed by the processor 116. In other implementations, the server components can be any assembly and/or set of operatively-coupled electrical components separate from the at least one processor 116 and the at least one memory 118, including but not limited to field programmable gate arrays (FPGAs) and/or application-specific integrated circuits (ASICs).

A broadcast generator 120 can be a server component configured to instantiate and/or terminate user broadcasts. For example, the broadcast generator 120 can receive a notification, message, and/or other signal from the at least one processor 116 indicating that the broadcast mobile application 104 has been opened by the user, and can instantiate a broadcast data structure associated with the user. The broadcast generator 120 can also delete broadcast data structures, e.g., based on predetermined criteria. Further details about the broadcast generator 120 can be found at least in FIGS. 2 and 4A, described in further detail herein.

A broadcast manager 122 can be a server component configured to manage content uploaded to be broadcasted, and/or updating aspects of the broadcast. For example, the broadcast manager 122 can receive uploaded user content, can link the content to the broadcast, can provide the content to users with access to the broadcast, and can edit aspects of the broadcast based on user input. Further details about the broadcast generator 120 can be found at least in FIGS. 3 and 4A-B, described in further detail herein.

The at least one broadcast database 114 can be implemented via a data storage device and/or a memory configured to store multiple records relating to Users records 114a, Media (e.g., content) records 114b, Broadcast records 114c, Live Feed metadata records 114d, Personal Contacts records 114e, Replies records 114f, Likes records 114g, Elastic-Cache 114h, Downloads records 114i, and/or Views records 114j. Tables in the at least one broadcast database 114 can be distributed across multiple databases, or can be stored in one database.

The Users records 114a can include information about a user account for a user creating and sharing broadcasts, such as but not limited to a user identifier, a user name, a user email address, a user password, a user's active broadcasts and/or broadcasting status, a date the user opened her account, an authorization token for the user, and/or other user information. The Media records 114b can include information about content provided from the user, including but not limited to a content identifier, a content capture timestamp, a content upload timestamp, a content type (e.g., a photo, a stream of photos, a video and/or set of videos, an audio file, and/or similar media), a display height of the content, a display width of the content, a user identifier associated with the user uploading the content, the length or size of the content (e.g., the length of a video and/or audio file), a list of recipients (e.g., a list of users viewing the content via a broadcast), and/or other user information.

The Broadcasts records 114c can include information about broadcast data structures, such as but not limited to a broadcast identifier, a user identifier associated with a user initiating the broadcast, a start time for the broadcast, an end time for the broadcast, a list of recipients accessing the broadcast, privacy settings (e.g., whether or not contacts of the user can access the broadcast), location settings (e.g., whether or not only users in close geographic proximity to the broadcasting user can access the broadcast) and/or other user information. The Live Feeds records 114d can include metadata relating to a currently-active broadcast, including but not limited to a live feed object metadata record identifier, an identifier corresponding to a user associated with a broadcast, an identifier corresponding to the owner of the content in the broadcast, a timestamp indicating when the content was generated, a content type (e.g., a photo, a video, an audio file, and/or the like), dimensions (e.g., width and height) to display the content on a screen, a counter indicating a number of comments submitted for the broadcast, a counter indicating a number of likes submitted for the broadcast, and/or other user information.

The Personal Contacts records 114d can include information about a user's contacts, such as but not limited to a user identifier corresponding to the user, a contact identifier corresponding to the contact of the user, a flag indicating whether or not a connection between the user and the contact has been confirmed, a username of the user and a username of the contact, a date the relationship between the user and the contact was established, and/or other user information. The Replies records 114f can include information relating to replies submitted to a currently-active broadcast, including but not limited to a reply identifier, a user identifier corresponding to the user submitting the reply, an identifier corresponding to the broadcast, a reply content identifier, a broadcast content type (e.g., whether the broadcast included images, video, audio recordings, and/or the like), a location and/or position of the reply in the broadcast and/or in media included in the broadcast, and/or other user information. For example, replies, instead of being a traditional comment, can be an additional, separate image and/or text that is overlaid onto broadcast content, and/or the like, to modify the display of the broadcast content.

The Likes records 114g can include information relating to likes submitted to a currently-active broadcast, including but not limited to a user identifier corresponding to the user submitting the "like" rating, an identifier corresponding to the content of the broadcast, and/or other user information. The ElasticCache records 114h can include cached data for broadcasts, including cached replies, cached contacts lists, cached broadcast content, cached information relating to media, replies (e.g., which users replied to content), views (e.g., which users reviewed content), and/or other user information.

The Downloads records 114i can include information relating to when shared media has been downloaded by other users, including but not limited to a media identifier, a user identifier associated with the owner of the media, user identifiers associated with users who have downloaded the media, a counter indicating the number of times the media has been downloaded, a date and/or multiple dates indicating when the media was downloaded, the first and/or most recent download time, and/or the like, and/or other user information. The Views records 114j can include information relating to when the shared media has been viewed by another user, including but not limited to a media identifier, a user identifier associated with the owner of the media, user identifiers associated with users who have viewed the media, a counter indicating the number of times the media has been viewed, a date and/or multiple dates indicating when the media was viewed, the first and/or most recent view, and/or the like, and/or other user information.

Figure 2:
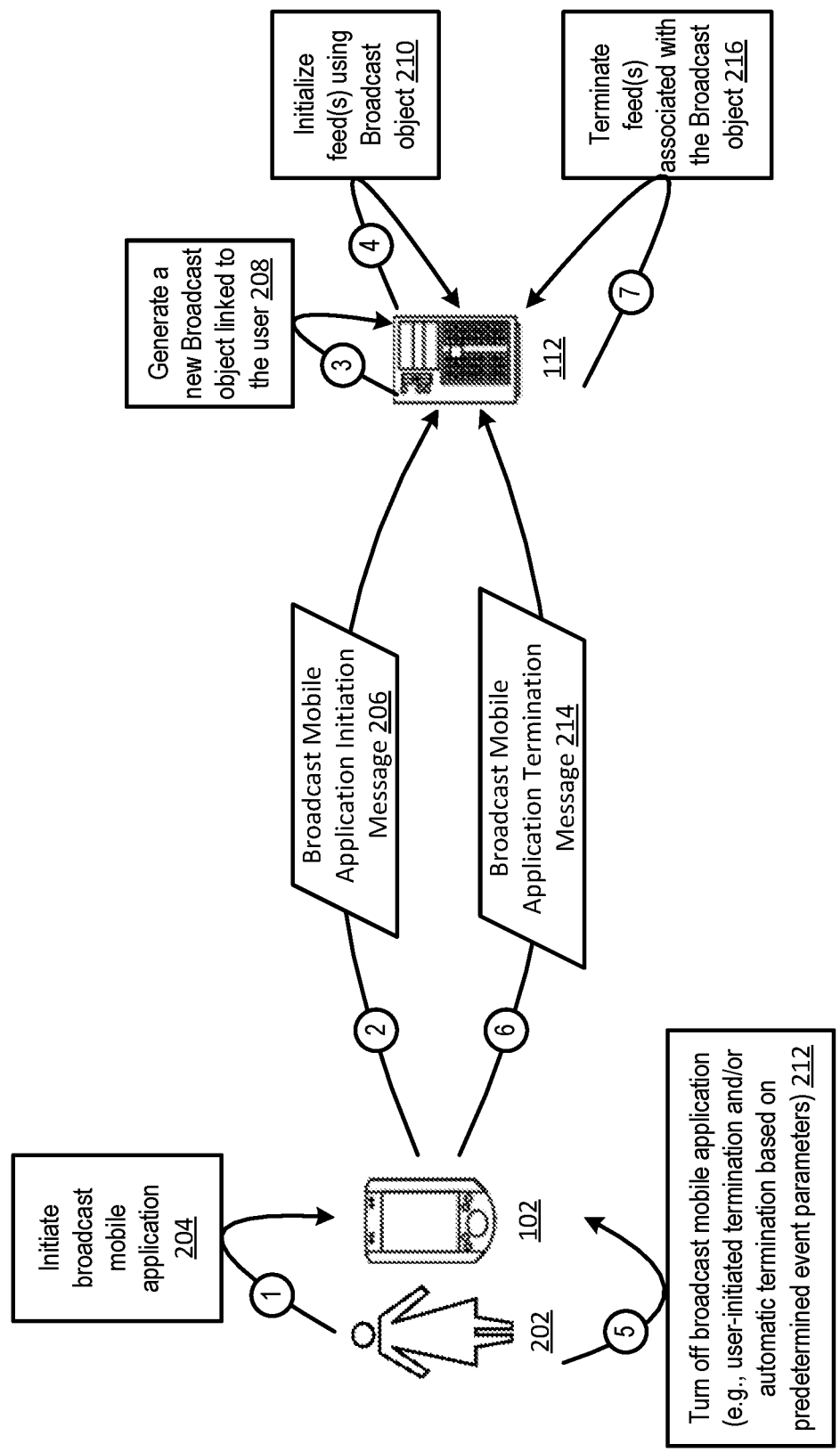
FIG. 2 is a schematic diagram illustrating a process for instantiating a broadcast data structure, according to an embodiment.

FIG. 2 is a schematic diagram illustrating a process for instantiating a broadcast data structure. For example, in some implementations, a user 202 can initiate 204 a broadcast mobile application 104, e.g., on her mobile device 102. The mobile device 102 can send a broadcast mobile application initiation message 206 to the broadcast server 112. The broadcast mobile application initiation message 206 can include user-identifying information (e.g., the user's username, a user account identifier, and/or the like), and can instruct the broadcast server 112 to instantiate a broadcast data structure for the user, e.g., such that the broadcast mobile application 104 can later automatically distribute content by associating the content with the generated broadcast data structure.

The broadcast server 112 can generate 208 a new broadcast object, e.g., linked to the user's account in the broadcast database 114, and can initialize 210 a broadcast feed, e.g., using the broadcast object. In some implementations, the broadcast object can be a data structure including a field with a field value that uniquely identifies user 202, user's mobile device 102 and/or an event. Differently stated, data objects can be generated from inputs received from different compute devices, each data object can include a value that uniquely identifies a user, an event attended by the user, and the user's compute device (e.g., mobile device 102). In some instances, such a broadcast object remains in the broadcast server 112 (e.g., in a record included at Broadcast records 114c) for a predefined a predetermined amount of time associated with an event. In some implementations, the broadcast feed can be a live and/or live feed object of the user's uploaded content, and can be accessed by one or more other users.

In some instances, once the broadcast server 112 creates the broadcast object, the user 202 can provide input 212 to her mobile device 102 to close and/or otherwise turn off the broadcast mobile application 104. The mobile device 102 can send a broadcast mobile application termination message 214 to the broadcast server 112, and the broadcast server 112 can terminate the broadcast feed associated with the user's broadcast object. For example, the mobile device 102 can send a broadcast mobile application termination message 214 (e.g., based on an indication from the user that the user would like to terminate the broadcast, such as selecting an "end" button and/or the like) that can include an identifier of the user's broadcast data structure, user-identifying information (e.g., the user's username, a user account identifier, and/or the like). Terminating the broadcast feed can terminate other users' access to the content associated with the user's broadcast data structure. In some implementations, the broadcast can be temporarily suspended and automatically restarted. In other implementations, the broadcast server can automatically terminate the broadcast feed when predetermined event criteria are met (e.g., when the event ends, when the user is no longer within a predetermined geolocation radius of the event, and/or the like).

Figure 3:
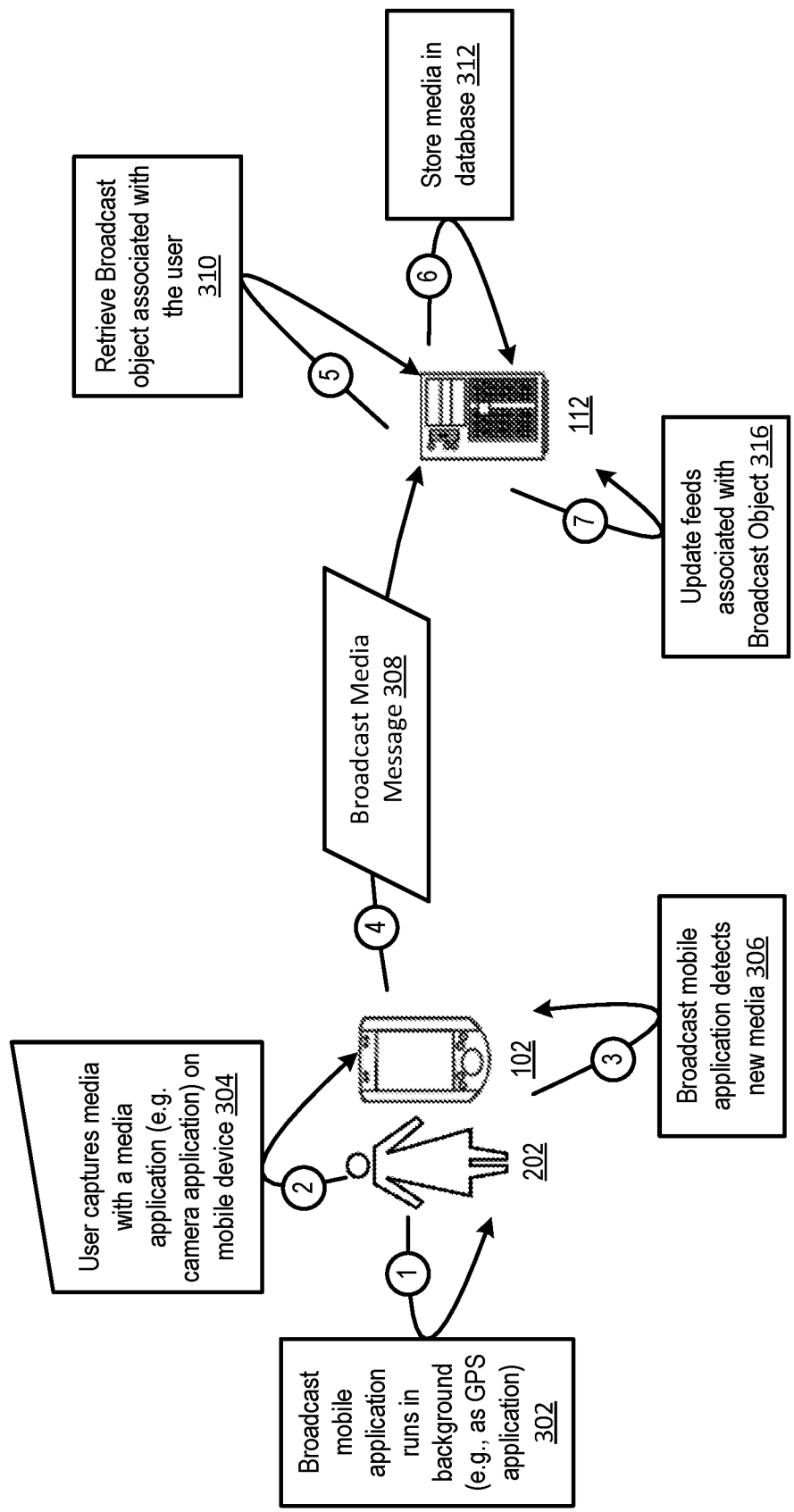
FIG. 3 is a schematic diagram illustrating a process for initiating a broadcast, according to an embodiment.

FIG. 3 is a schematic diagram illustrating a process for initiating a broadcast. In some instances, the broadcast mobile application runs in the background as shown at 302 and automatically detects when a user captures media with the device's native media application and/or other media application (e.g., native camera application shown in FIG. 18) as shown at 304. The broadcast mobile application detects, at 306, that a new media file was produced at mobile device 102 and sends a broadcast media message 308 to the broadcast server 112. At 310 the server 112 retrieves the broadcast object associated with the user from, for example, the broadcast database 114 and stores at 312 (e.g., in broadcast database 114) the media file and user-identifying information (e.g., user's username, a user account identifier, media metadata and/or the like). At 316, the server updates feeds associated with the broadcast object (for instance, based on a media file received at 308) and sends notifications to broadcast mobile application 104 discussed with reference to FIG. 1 to inform user 202 of, for example, via a notification indicating about the time when the media file received at 308 was broadcasted. Likewise, a notification indicating when the media file in the broadcast object failed to be broadcasted and other suitable notifications.

Figure 4A:
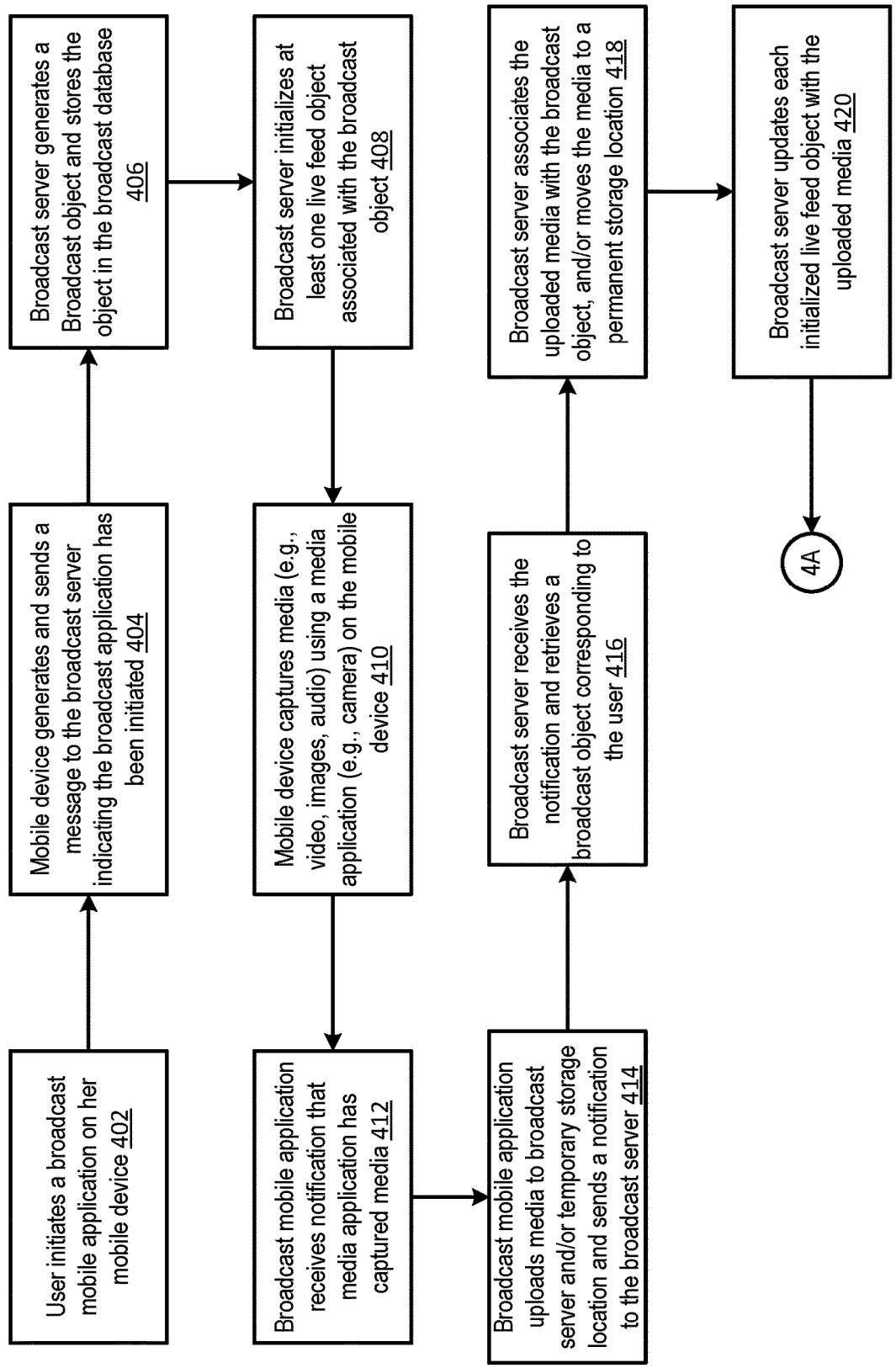
FIGS. 4A-B are logic flow diagrams illustrating a process for defining and modifying a broadcast, according to an embodiment.
Figure 4B:
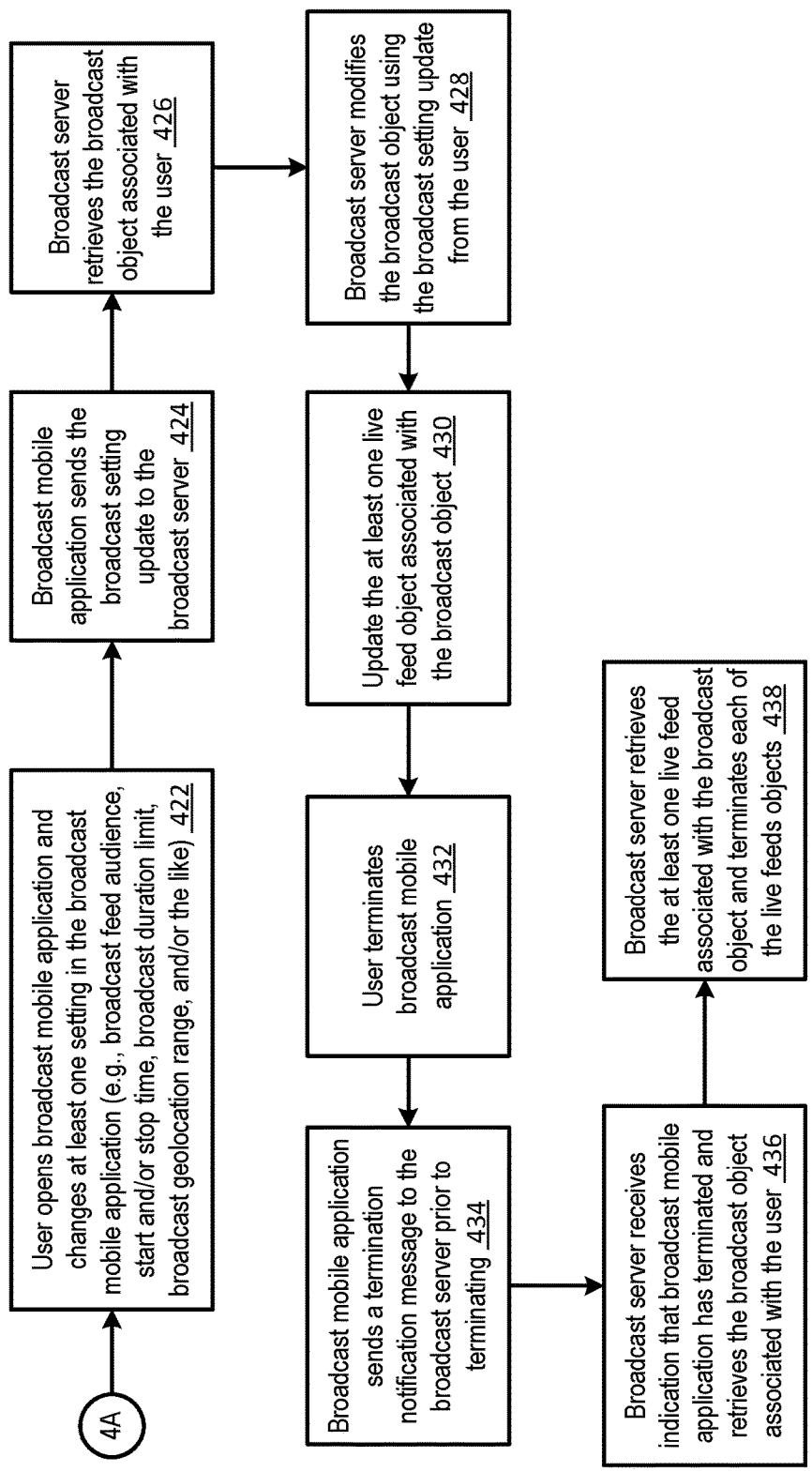

FIGS. 4A-B are logic flow diagrams illustrating a process for defining and modifying a broadcast object. At 402, a user initiates a broadcast on her mobile device (e.g., mobile device 102 discussed with reference to FIG. 1, FIG. 2, and FIG. 3) using the broadcast mobile application 104. The mobile device generates and sends at 402 a message to the broadcast server (e.g., broadcast server 112 discussed with reference to FIG. 1, FIG. 2, and FIG. 3) indicating the broadcast application has been initiated. The broadcast server generates a broadcast object and stores at 406 the broadcast object in the broadcast database. The broadcast server 112 initializes at 408 at least one live feed object associated with the broadcast object (e.g., a live feed object of the content of a media file included in the received broadcast object).

Figure 18:
FIG. 18 is a screenshot of a graphical user interface illustrating a media mobile application of a mobile device, according to an embodiment.

The user continues using her mobile device to capture media at 410 (e.g., photo, video, audio, and/or the like) using a media application (e.g., device native camera application as shown at FIG. 18) on the mobile device. Broadcast mobile application 104 scans the media library of the mobile device 202 to determine when the media application has captured additional new media. To recognize that the media application has captured new media, the broadcast mobile application executes a background process or daemon application. In some instances, the broadcast mobile application 104 parses and uploads at 414 the media file to the broadcast server and/or temporary storage location and sends a notification to the broadcast server. In some other instances, the broadcast mobile application 104 executes a function or method when a user captures a media file (e.g., a picture, video, voice, or other suitable media file) and thus, sends or uploads the media file in real-time or substantially in real-time. At 416 broadcast server 112 receives the notification and retrieves a broadcast object corresponding to the user. At 418, the broadcast server associates the uploaded media with the broadcast object and/or moves the media to a permanent storage location. The broadcast server also stores in a database the user-identifying information related to the broadcast object and the media. The broadcast server updates at 420 each initialized live feed object with the uploaded media and sends updates to the broadcast mobile application regarding broadcasted media via live feed objects.

In some implementations, the broadcast mobile application can monitor the device's photos/videos to see if new media has been added while the media mobile application 104 is on and active. In some instances, when the mobile application 106 is inactive, the broadcast server 112 can send notifications to the mobile device 102 intermittently to wake up the mobile application 104. In some instances, the broadcast server 112, can monitor the GPS location of the mobile device 102 and wake up the broadcast mobile application as a user moves around (or moves away from an event), to ensure that the broadcast mobile application is on and active. In some instances, when user 202 opens up the broadcast mobile application, the broadcast server can also instruct the broadcast mobile application to scan the device's media to see if any new media has been added.

Attention is now drawn to FIG. 4B at 422 the user opens up the broadcast mobile application and changes at least one setting in the broadcast mobile application (e.g., broadcast feed audience, start and/or stop time, broadcast geolocation range, broadcast duration or other suitable setting) to modify the broadcast. The broadcast mobile application sends at 424 the updated broadcast setting to update a corresponding setting at broadcast server 114. At 426 the broadcast server retrieves (from, for example broadcast table 114c shown in FIG. 1) the broadcast object associated with the user. The broadcast server modifies the broadcast object using the broadcast setting update received from the mobile device 202. Thereafter at 430, the broadcast server updates the at least one live feed object associated with the modified broadcast object. A modified broadcast object remains valid, until the user chooses to modify or terminate the broadcast settings. At 432, the user terminates the broadcast mobile application, and the broadcast mobile application sends at 434 a termination notification message to the broadcast server 112 prior to termination. At 436, the broadcast server 112 receives the termination notification message and retrieves the broadcast object associated with the user. The broadcast server 112 retrieves at 438 the at least one live feed object associated with the broadcast object and stops broadcasting media via live feed objects associated with the broadcasted object.

Figure 5A:
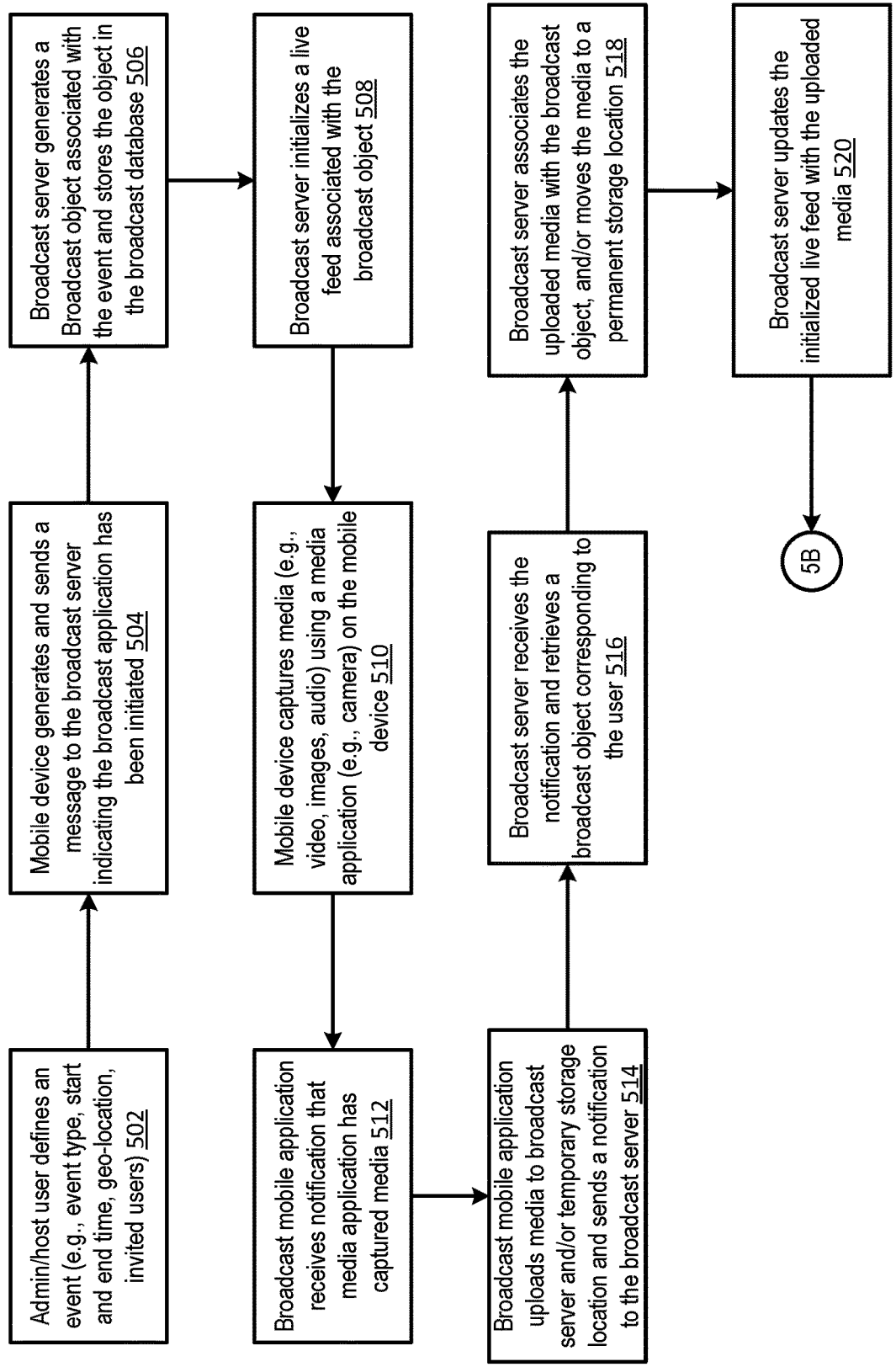
FIGS. 5A-B are logic flow diagrams illustrating a process for defining and modifying a broadcast for an event, according to an embodiment.
Figure 5B:
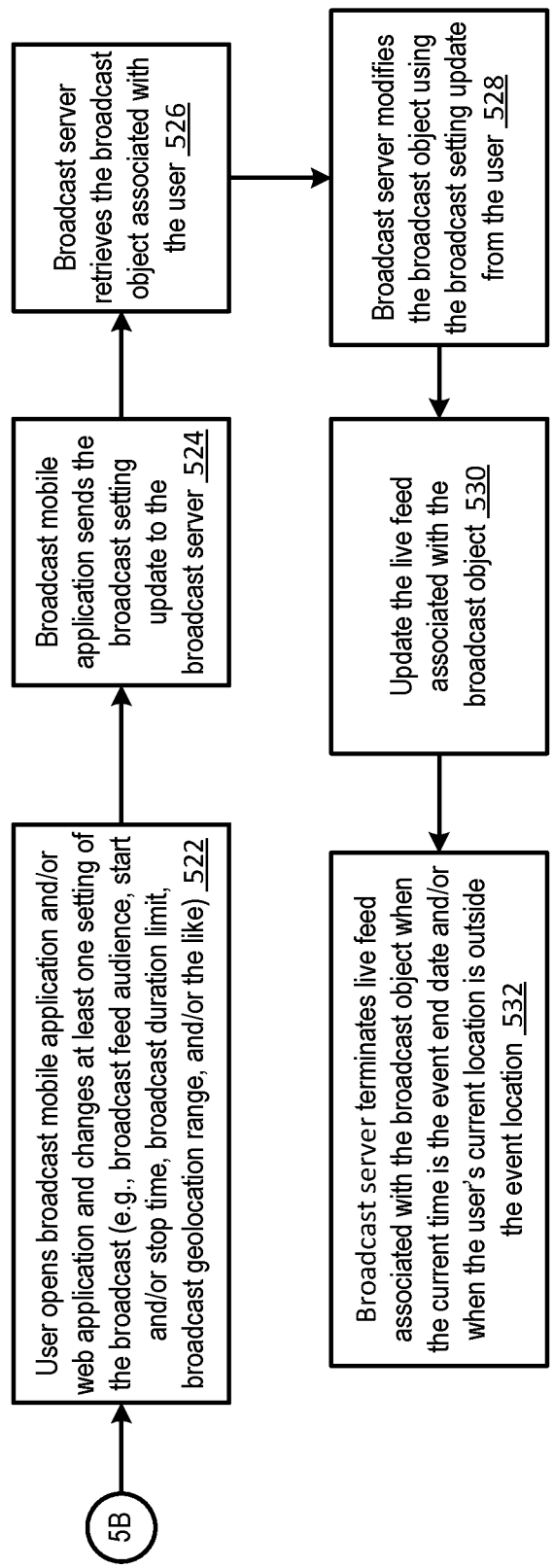

FIGS. 5A-B are logic flow diagrams illustrating a process for defining and modifying a broadcast, according to an embodiment. In some implementations, a user can define an event on her mobile device using the broadcast mobile application 502, e.g., including specifying an event type, a start and end type of the event, a geolocation of the event, a list of invited users, and/or the like. The mobile device generates and sends a message to the broadcast server indicating the broadcast mobile application has been initiated 504.

The broadcast server generates a broadcast object and stores the object in the broadcast database 506. The broadcast server initializes a live feed object associated with the broadcast object 508. The user uses her mobile device to capture media (e.g., photo, video, audio, and/or the like) using a media application (e.g., device native camera application) on the mobile device 510. Broadcast mobile application receives a notification by scanning the media library of the device that the media application has captured additional new media 512. To recognize that the media application has captured new media, the broadcast mobile application is active in the background; the broadcast server will send silent push notification to the broadcast mobile application, and/or monitor the GPS location of the device to ensure that the broadcast mobile application is on. The broadcast mobile application will also recognize whether the media application has captured new media when the user opens up the broadcast mobile application.

The broadcast mobile application parses and uploads the media to the broadcast server and/or temporary storage location and sends a notification to the broadcast server 514. Broadcast server receives the notification and retrieves a broadcast object associated with the user 516. Broadcast server associates the uploaded media with the broadcast object and/or moves the media to a permanent storage location 518. The broadcast server also stores in a database the user-identifying information related to the broadcast object and the media. The broadcast server updates the initialized live feed object with the uploaded media 520 and the broadcast application updates accordingly.

Said another way, in some implementations, the broadcast server can monitor the device's photos/videos to see if new media has been added while the media mobile application 106 is on and active. To ensure that the broadcast media application is on and active, the broadcast server can send notifications to the device intermittently to wake up the broadcast mobile application, can monitor the GPS location of the device to wake up the broadcast mobile application as a user moves around, and, when the user opens up the broadcast mobile application, the broadcast server can also instruct the broadcast mobile application to scan the device's media to see if any new media has been added.

Referring to FIG. 5B, to modify a broadcast, the user can open the broadcast mobile application on her electronic device and/or within a web application, and can change at least one setting in the broadcast mobile application (e.g., broadcast feed audience, start and/or stop time, broadcast geolocation range, broadcast duration and/or the like) 522. The broadcast mobile application scan sends a signal including the broadcast setting to update to the server 524. The broadcast server can retrieve the broadcast object associated with the user 526. The broadcast server can modify the broadcast object using the broadcast setting update from the user device 528. The broadcast server can update a live feed object associated with the modified broadcast object 530. The modified broadcast object can remain valid while the event associated with the modified broadcast object is still active. Specifically, the broadcast server can terminate 532 the live feed object associated with the broadcast object when the event has ended (e.g., when a current time matches and/or has surpassed the event end time), and/or when the user has left the event (e.g., when the user's current location is outside the event location by a predetermined distance).

In some implementations, the broadcast mobile application 104 is sustained awake or in operation during the length of an event by the implementation of a location, tracking component configured to operate with a low location accuracy (i.e., a wide radius). Thus, the location tracking component does not need to use the mobile device Global Positioning System (GPS) chip, but can rather rely on cell tower geolocation techniques to track the mobile device. Accordingly, power or battery consumption can be minimized because cell tower geolocation techniques consume less power than using the GPS chip.

In some implementations, the broadcast server 112 pushes silent notifications to each user when sharing starts and for a period of pre-determined number of days after. Thus, when location services are disabled at the mobile device 102 the broadcast mobile application 104 periodically wakes up and uploads the photos, videos, or other suitable media files. Accordingly, this technique is both a fall back and way to increase the probability that media files end up uploaded to the broadcast server 112. The silent notifications are sent for a predetermined time after the event in case the user did not have data service during the event and gets it after the event ends.

In some implementations, the broadcast mobile application 104 is configured to upload full resolution videos only when the mobile device 102 is operating on, for example, a wireless local area network (Wi-Fi) as opposed to cellular data accordingly, the data usage of broadcast mobile application 104 can be minimized. In some instances, when photos and videos are set to only upload over Wi-Fi—the broadcast mobile application 104 shows that there are photos and videos to upload in the app and allows the user to tap to upload immediately despite not being on Wi-Fi. In some further instances, when the mobile device 102 is not operating on Wi-Fi (e.g., is operating on cellular data) the mobile application 104 can upload a short version of a captured media file instead of the whole media file and postpone the complete upload of the media file once the mobile device 102 is connected to a Wi-Fi.

In some implementations, broadcast server 112 can invite users to join a broadcast event via email or text message. In some instances, server 112 sends an email or text message with a link that directs a user to for example, an app store with the broadcast mobile application 104 ready to be downloaded. Broadcast server 112 uses attribution technology such that, when the users clicks on the link and downloads the broadcast mobile application 104, the mobile application is already preconfigured to display a custom load screen. Such a custom load screen shows the event a user has been invited to thus, a user is not required to perform further actions, for instance, a user does not have to browse among a list of events to find the event to which she has been invited. In some implementations, the mobile application 104 can group multiple events to which a user has been invited and the user can join all the events at once with a single click.

It is appreciated that the broadcast mobile application 104 enables users to keep control over the media files that are shared from their mobile devices to the broadcast server 112. For instance, mobile application 104 can use text messages to notify a user when sharing mode is beginning and/or ending i.e., when a broadcast event starts and ends. Broadcast mobile application 104 also displays a notification on the user mobile device 102 each time a new media file is detected in the device's media library and/or shared. Thus, the user can be kept aware that the mobile device 102 is temporarily configured to share media files with broadcast server 112. Even after accepting to participate in a broadcast event, users can enable and disable, via broadcast mobile application 104 the sharing of media files from their mobile device to broadcast server 112.

In some instances, when a user joins an event in progress or after it has ended, the broadcast mobile application 104 prompts the user to indicate whether she wants to share media files captured during the event period missed and enables the user to select which media files to share, if any. Users can remove from the broadcast server 112 any published media files captured via their devices through broadcast mobile application 104.

In some implementations, broadcast mobile application 104 constrains the sharing of media files to be within a specific distance of a location, for instance, within specific distance of a center point of an event that is taking place. Differently stated, a center point of an event can be computed by computing descriptive statistics (e.g., central tendency statistics such as mean, median or mode) and/or centroid-based cluster analysis on geolocations received by broadcast server 112 from multiple instances of broadcast mobile applications associated with an ongoing event. Moreover, a geolocation radius of an event can be computed based on the center point of an event and a predetermined distance used as the radius of a circled shaped area corresponding to the geolocation radius of an event. Thus, in such implementations, media files captured within a specific distance of a center point of an event computed based on a set of media files and geolocations captured and associated with such event are determined eligible for sharing. According to this implementation, broadcast mobile application 104 and/or broadcast server 112 can adjust for outliers (like someone sharing after they leave or at home) by ignoring all photos/videos outside of a predetermined number of standard deviations from the center point of photos/videos being taken.

In some implementations, the broadcast mobile application 104 and/or broadcast server 112 are aware when a group of users is moving over the course of an event by computing and/or re-computing the center point of an event. For example, as discussed above, the broadcast mobile application 104 can periodically or otherwise retrieve geolocations from a GPS circuit included in mobile device 102 and/or retrieve the strength of the mobile device signal (e.g., decibels) with respect to one or more a cell towers. Accordingly, when a mobile device sends a message to broadcast a media file, the message can include geolocation and/or signal strength with respect to one or more cell towers of the mobile device. The broadcast server 112 can use a set of received geolocations and/or signal strength with respect to one or more cell towers to calculate the center of an event by applying, for example, geolocation techniques including, triangulation, trilateration, and/or other suitable geolocation techniques.

In some instances, when the center point of an event is not static or stationary (e.g., participants of an event are move from one location to another) the broadcast server 112 can weight more heavily those media files that have been captured more recently to compute a new center point of the event. In some instances, broadcast mobile application 104 can prompt users (e.g., via a text message) to indicate whether they want to turn off the automatic sharing of media files with broadcast server 112 when users move a predetermined distance from the center point of an event.

The examples discussed below with reference to FIG. 6 to FIG. 17 are examples of graphical user interfaces displayed on one or more compute devices implementing the broadcast mobile application 104 and the media mobile application 105 discussed with reference to FIG. 1. The broadcast server 112 broadcasts media files to one or more compute devices running the broadcast mobile application 104. For instance, the videos and/or pictures displayed via the broadcast mobile application 104 are received from the broadcast server 112. In some other implementations, the broadcast server 112 can publish or broadcast media files received from one or more compute devices implementing the broadcast mobile application 104 at, for example, a webpage. Differently stated, the broadcast server 112 can operate as a host server for a plurality of instances of broadcast mobile application 104, a webpage or other suitable application.

Figure 6:
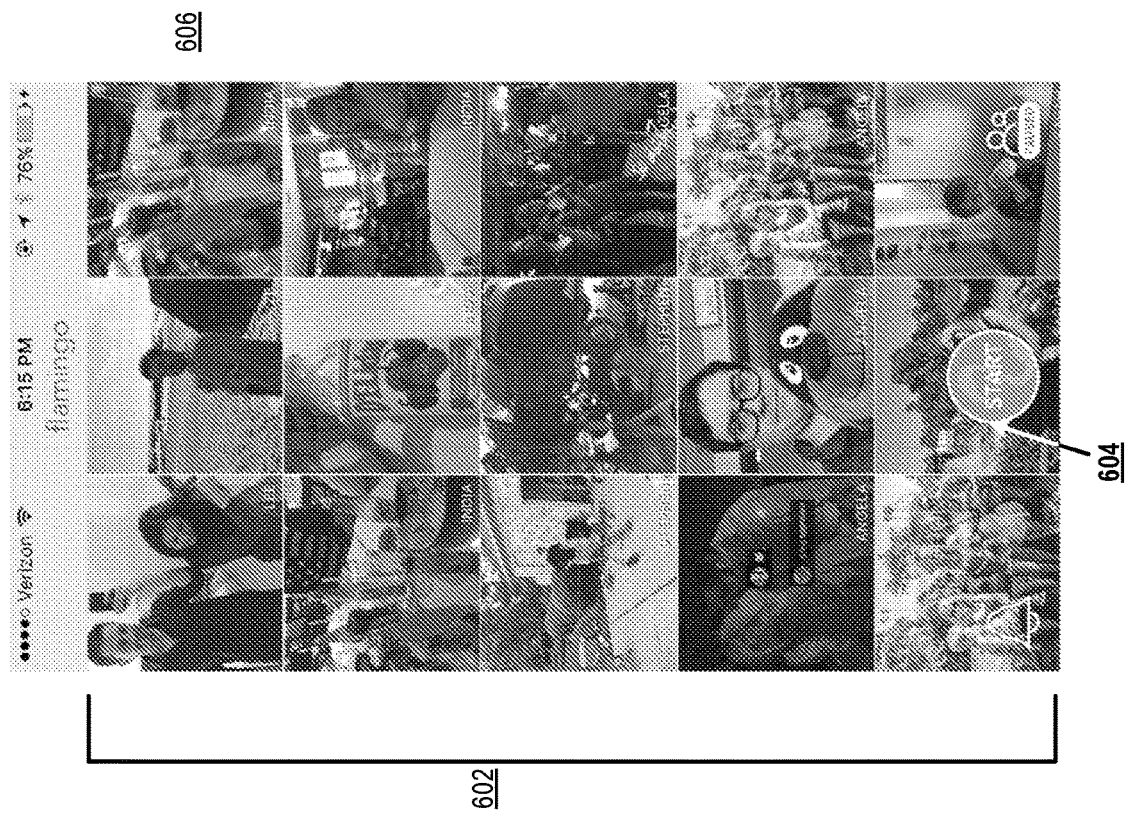
FIG. 6 is a screenshot of a graphical user interface illustrating a broadcast user interface, according to an embodiment.

FIG. 6 is a screenshot illustrating a broadcast graphical user interface. In some implementations, a main screen 606 gives the users the ability to view and interact with broadcast content that the user has access to and to navigate to other screens ad experiences. The user sees a scrollable feed of broadcast content including content 602 (e.g., photos, videos, audio files, and other media). The content includes the user's broadcast content as well as broadcast content from personal contacts of the user that have given permission. The user can initiate a broadcast by tapping an initiate or "start" button 604.

Figure 7:
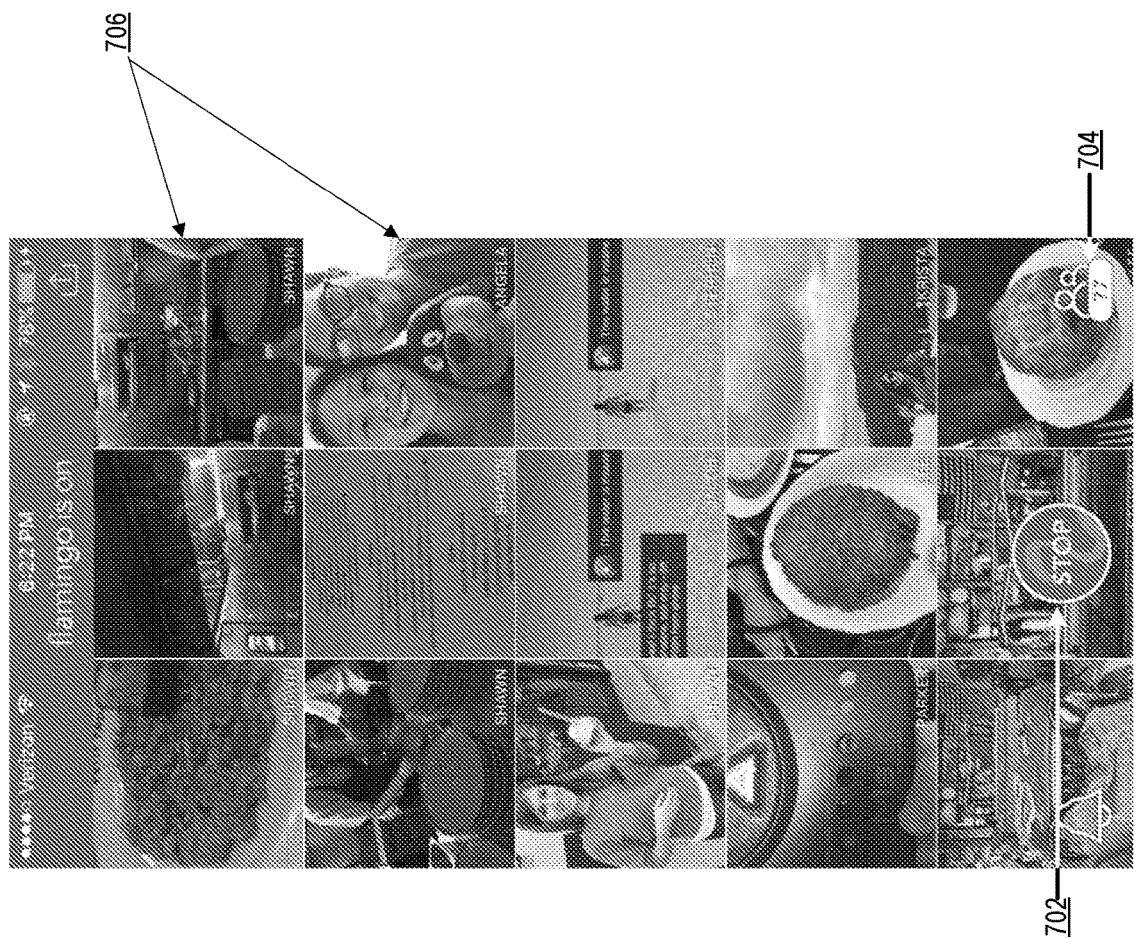
FIG. 7 is a screenshot of a graphical user interface illustrating performing a broadcast, according to an embodiment.

FIG. 7 is a screenshot illustrating performing a broadcast via a graphical user interface. In some implementations, when a broadcast is initiated, 702 changes so that a user can tap to deactivate the broadcast. The user interface will also make it clear that the broadcast is initiated. The broadcast mobile application indicates at 704 the number of personal contacts to whom the user is currently broadcasting content to and it can also be tapped to change the number of personal contacts on the broadcast or add or remove personal contacts altogether. At 706 are shown examples of live feeds with broadcasted media files sent from different users.

Figure 8:
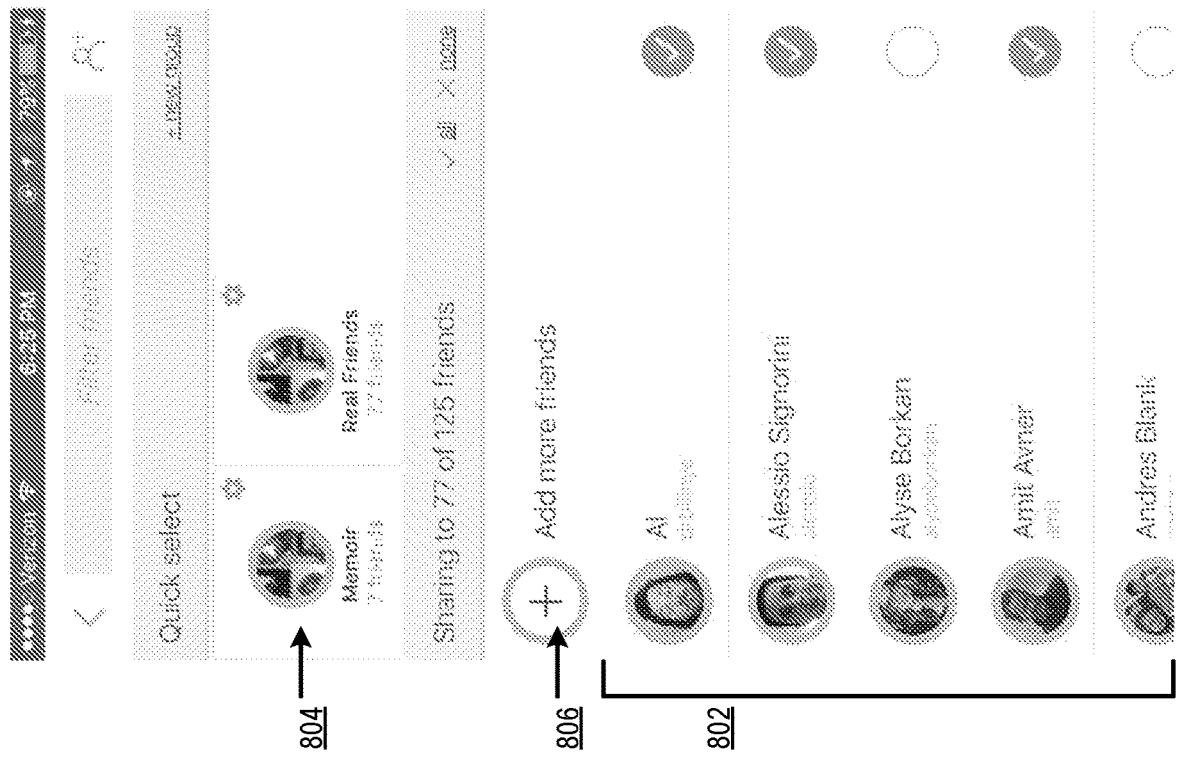
FIG. 8 is a screenshot of a graphical user interface illustrating editing a broadcast, according to an embodiment.

FIG. 8 is a screenshot illustrating editing a broadcast via a graphical user interface. In some implementations, user can edit the broadcast recipients at any time. The application can include a list 802 of all personal contacts the user has, and the user can select or deselect any friend in the list to broadcast content to that user. The user can create groups of personal contacts to select all the personal contacts (who are in that group) simultaneously in 804. The user can at any point add more personal contacts who are already on the platform or to invite people to join the platform (806).

Figure 9:
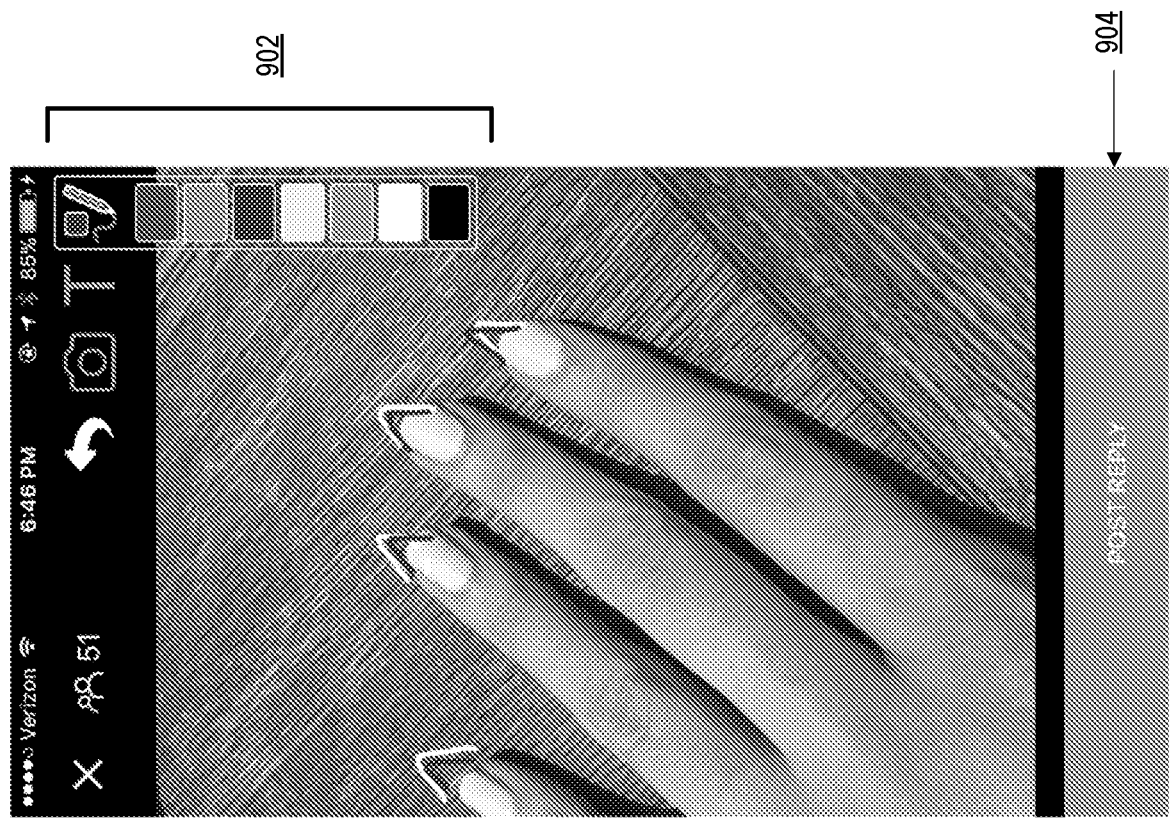
FIG. 9 is a screenshot of a graphical user interface illustrating replying to broadcast content, according to an embodiment.

FIG. 9 is a screenshot illustrating replying to broadcast content via a graphical user interface. Users can reply to any broadcast content and/or broadcast content response that they have access by clicking or tapping on a reply icon (overlaid on a live feed not shown in FIG. 9). The user can draw or handwrite on the media displayed on a live feed, add text, and/or capture a new media item in response to the broadcast content using for example, the widgets or graphical tools shown at 902. Thereafter, the responding user can press or click on the post reply button 904 which sends the modified media file to broadcast server 112 which publishes the response in a live feed and thus, one or more users in addition to the responding user can see the response.

Figure 10:
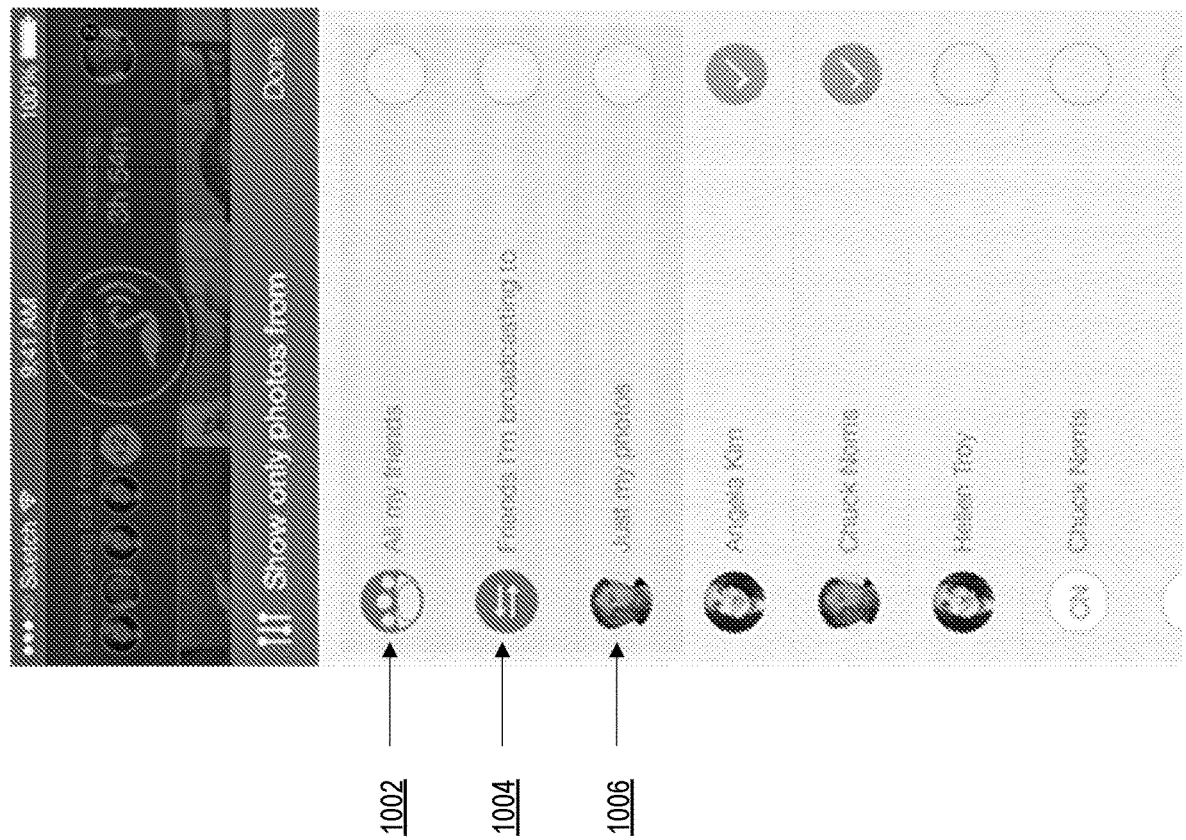
FIG. 10 is a screenshot of a graphical user interface illustrating filtering broadcasts, according to an embodiment.

FIG. 10 is a screenshot illustrating filtering broadcasts via a graphical user interface. Users can choose to filter the broadcast content by a variety of factors, including but not limited to friend, geography, time, and/or other parameters. For instance, a user can select to broadcast media files to all of her personal contacts by pressing the button 1002, broadcast media files to a subgroup of personal contacts by pressing the button 1004, or constrain the types of media files to broadcast to one or more users. For example, at 1006 a user has constrained a personal contact to receive only broadcasted photos.

Figure 11:
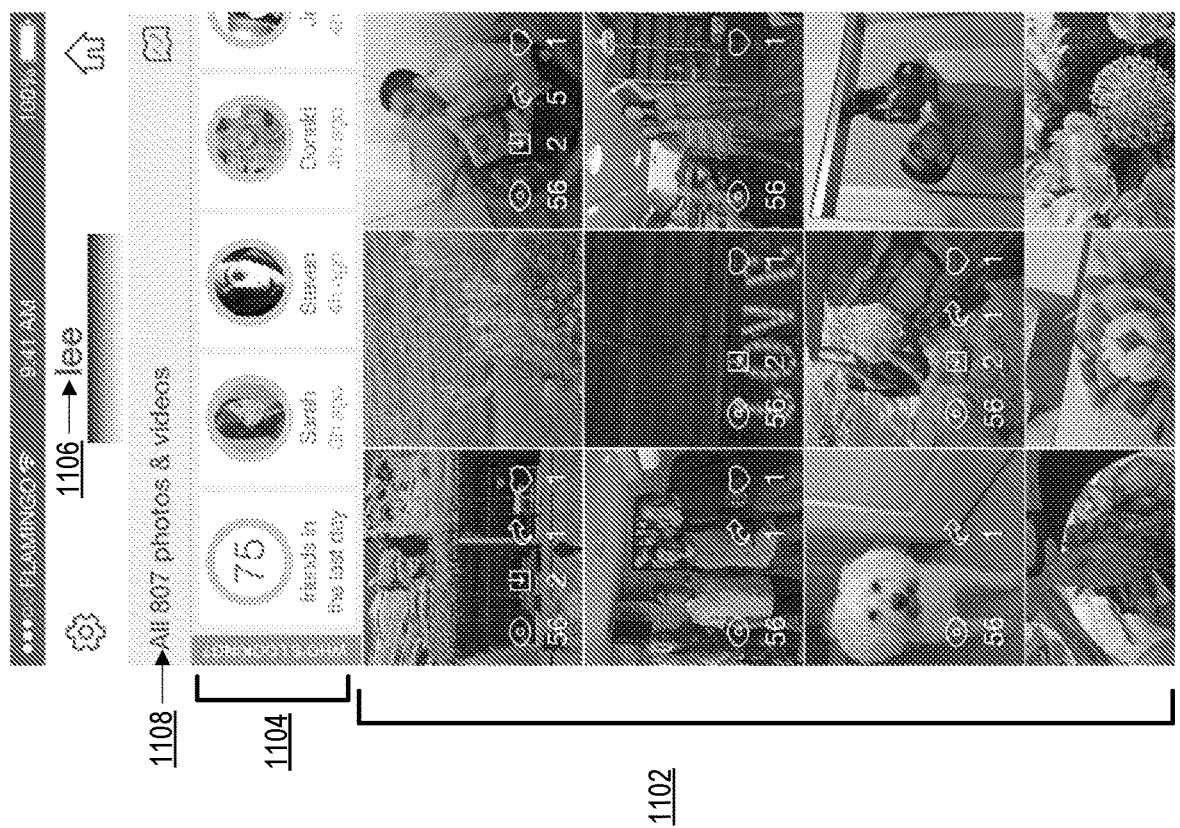
FIG. 11 is a screenshot of a graphical user interface illustrating friend activity on broadcast content, according to an embodiment.

FIG. 11 is a screenshot illustrating examples of a user's broadcasted content and activities of personal contacts made on the broadcast content via a graphical user interface. The graphical user interface shown in FIG. 11 shows, at 1102 media files broadcasted by the user identified at 1106. The graphical bar shown at 1108 provides information to the user identified at 1106 regarding the number of broadcasted media files. The graphical bar shown at 1104 provides information to the user identified at 1106 about, for example, the number of personal contacts that have seen the user's broadcasted content, while identifying such personal contacts as viewers and other suitable viewer related data. For instance, details of activities performed by personal contacts on the user's broadcast content can include views, replies, likes, downloads, and other suitable activities. In some instances, the graphical bar at 1104 can display who performed any activity on the user's broadcast content in, for example, the last 24 hours. Selecting a personal contact shown, for instance, at 1104 filters the user's broadcast content to show the specific activity that the selected personal contact performed on the user's broadcast content.

Figure 12:
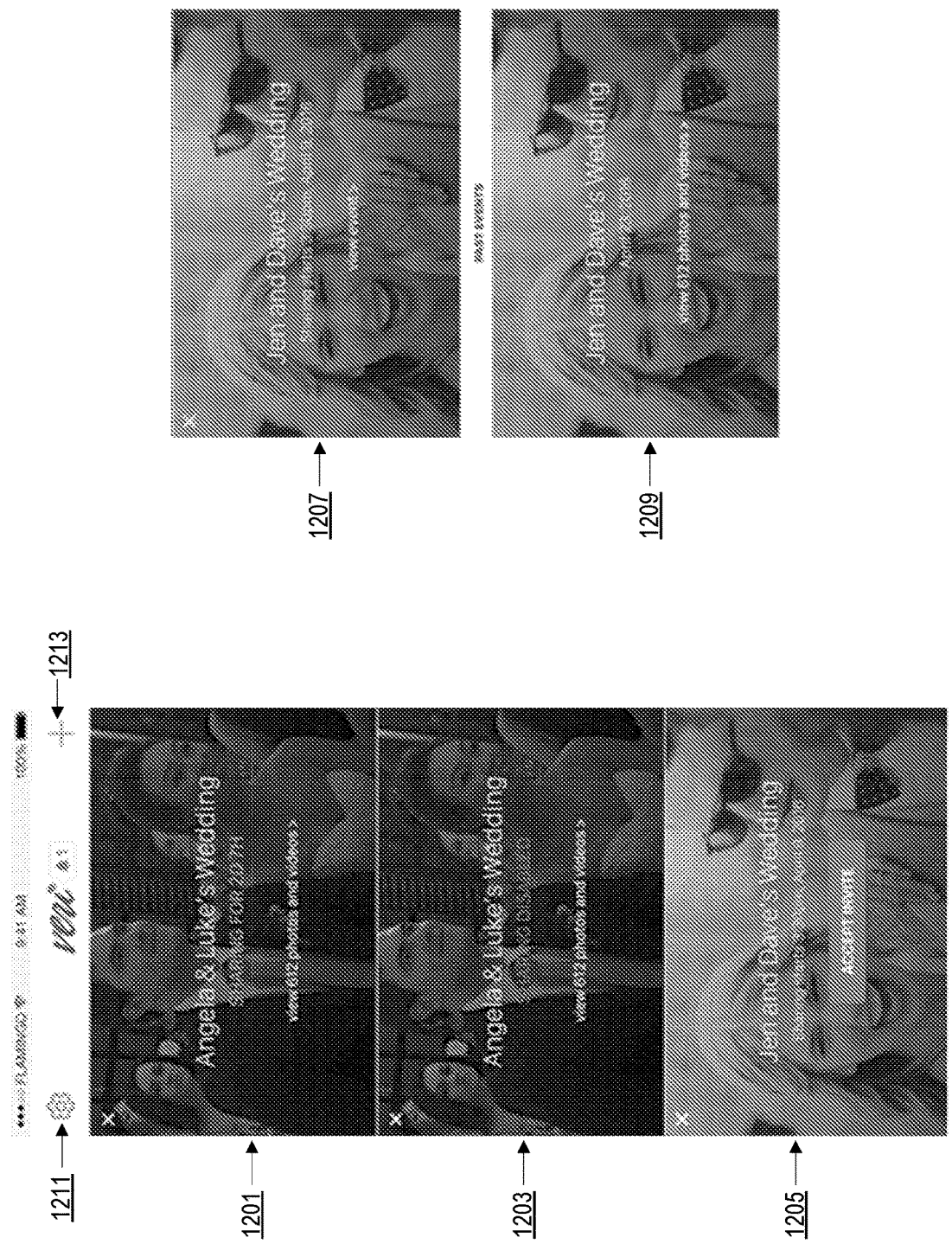
FIG. 12 is a screenshot of a graphical user interface illustrating an events feed, according to an embodiment.

FIG. 12 is a screenshot of a graphical user interface illustrating an events feed, according to an embodiment. For example, in some implementations, an events feed allows a user to view a list of events to which the user has access (i.e., a list of events for which the user can access live broadcast feeds including event shown at 1201 and event shown at 1209) and to navigate to other screens and experiences. The user can accept (e.g., be associated with) and event by accepting for instance the invitation shown at 1205 or leave (e.g., be disassociated with) events to which the user has been invited (via a phone call, text, email, or broadcast application notifications). The user can view the event to which the user has access by selecting an event in the event list, which can allow the user to view content (e.g., photos, videos, audio files, and other media). The user interface can display an image and/or icon associated with the event, a type of the event (e.g., active events where sharing is enabled as shown at 1201 or where sharing is disabled as shown at 1203, future events that the user has not yet accepted an invitation as shown at 1205, future events that the user has accepted an invitation as shown at 1207, and past events as shown at 1209), content associated with the event, and/or the like.

In some implementations, when a user accepts an invitation for a future event, for instance, when a user accepts the invitation shown at 1205. The broadcast media application 104 can send a push notification and/or a text message to inform the user when such event starts. For example, if a user accepts an invitation to attend an event scheduled for April 9, at 3.30 PM three months before the event's scheduled time then, the broadcast media application 104 (or alternatively the broadcast server 112) can send a notification text message at the scheduled time informing the user that an accepted event has started. Accordingly, the user is informed on April 9 at 3:30 PM that the broadcast media application 104 will begin to broadcast media files captured via the media mobile application 106. Likewise, in some other instances, the broadcast media application 104 (or alternatively the broadcast server 112) can send a notification text message to the mobile device 102 when the mobile device 102 indicates that the user is at the geolocation of the event at the scheduled time. In some other instances, the scheduled time can include a starting time and an ending time and the broadcast media application 104 (or alternatively the broadcast server 112) can send a notification text message to the mobile device 102 when the mobile device 102 indicates that the user is at the geolocation of the event at a time that is within the starting time and the ending time.

The graphical user interface can also include a settings icon 1211. A user may modify his/her own account information that personally identifies the user and creates an account. Likewise, the user interface can also include a plus icon 1213. A user (e.g., user 202 shown in FIG. 2) can join an event by pressing the plus icon 1213 and entering in a unique event code. In some implementations, a user may also create a new unique event for broadcasting of content from within the mobile application (not shown at FIG. 12).

Figure 13:
FIG. 13 is a screenshot of a graphical user interface illustrating an active broadcast content for an event, according to an embodiment.

FIG. 13 is a screenshot of a graphical user interface illustrating an active broadcast content for an event, according to an embodiment. For example, in some implementations, the broadcast content can include, e.g., photos, videos, audio files, and other media from the user and other users who have access to the event as shown at 1301. The graphical user interface can indicate when a broadcast is initiated (e.g., by displaying an icon and/or text indicating that an active broadcast live feed object is playing in the graphical user interface as shown at toggle switch 1303, and/or the like) and for how long the broadcast will last and/or if the broadcast has ended (e.g., by displaying a timer in the user interface indicating the amount of time left for the event associated with the broadcast as shown at 1305, by displaying an end time for the event associated with the broadcast, and/or the like). The user can choose to pause the broadcast at any point during the event broadcast, e.g., by pressing a button and/or a similar interface e.g., toggle switch 1303 component to pause a live feed object being rendered in the user interface. The user can navigate to other experiences (e.g., can view, download, share, or manually contribute content, etc.). The user interface can also indicate which other user created the broadcast content (e.g., by displaying the creating user's username and/or similar identifying information).

Figure 14:
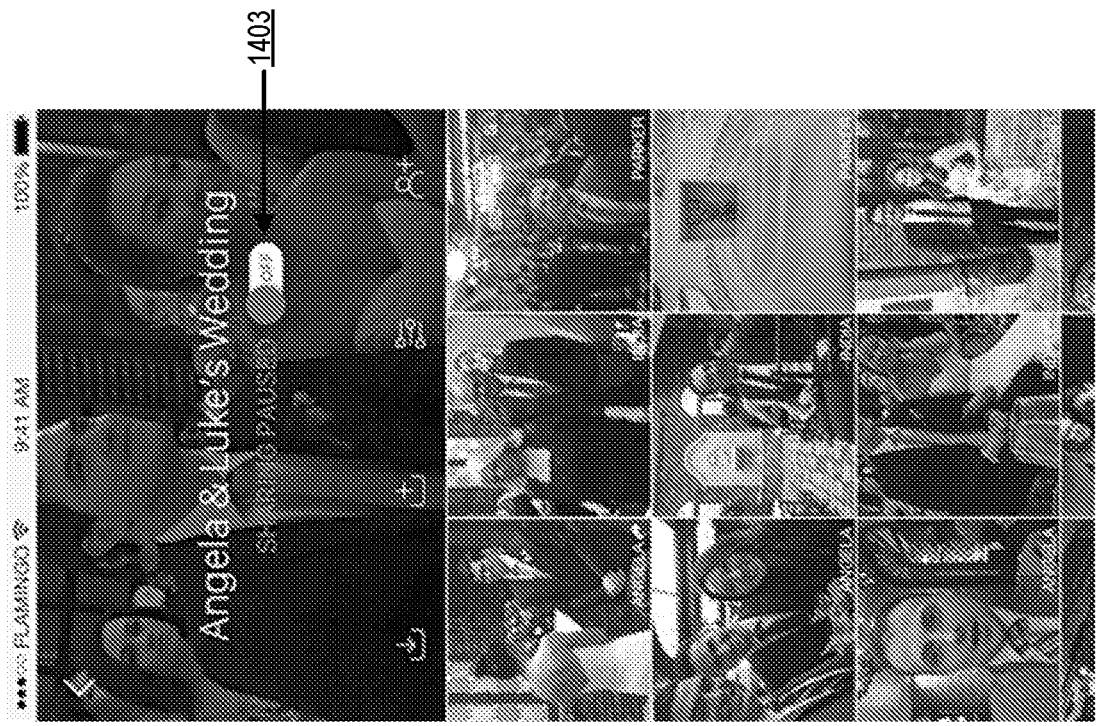
FIG. 14 is a screenshot of a graphical user interface illustrating paused broadcast content for an event, according to an embodiment.

FIG. 14 is a screenshot of a graphical user interface illustrating paused broadcast content for an event, according to an embodiment. In some instances, a user (e.g., user 202 shown in FIG. 2) can choose to re-initiate the broadcast at any point during the event broadcast by switching the toggle switch 1403 to "pause", and/or a similar interface mechanism, to restart the live feed object. In some implementations, if the administrator/host of the event optionally chooses to enable a geo-location radius (in addition to the event time parameters) for the event, when the user leaves the geo-location radius, the live feed object can automatically pause and/or end within the user interface (e.g., via toggle switch 1403). In some instances, the graphical user interface (or broadcast mobile application 104) can prevents the user from re-initiating the broadcast until the user is within the geo-location radius again, and/or the like. In some implementations, the broadcast can be similarly paused and/or ended when the event associated with the broadcast ends.

Figure 15:
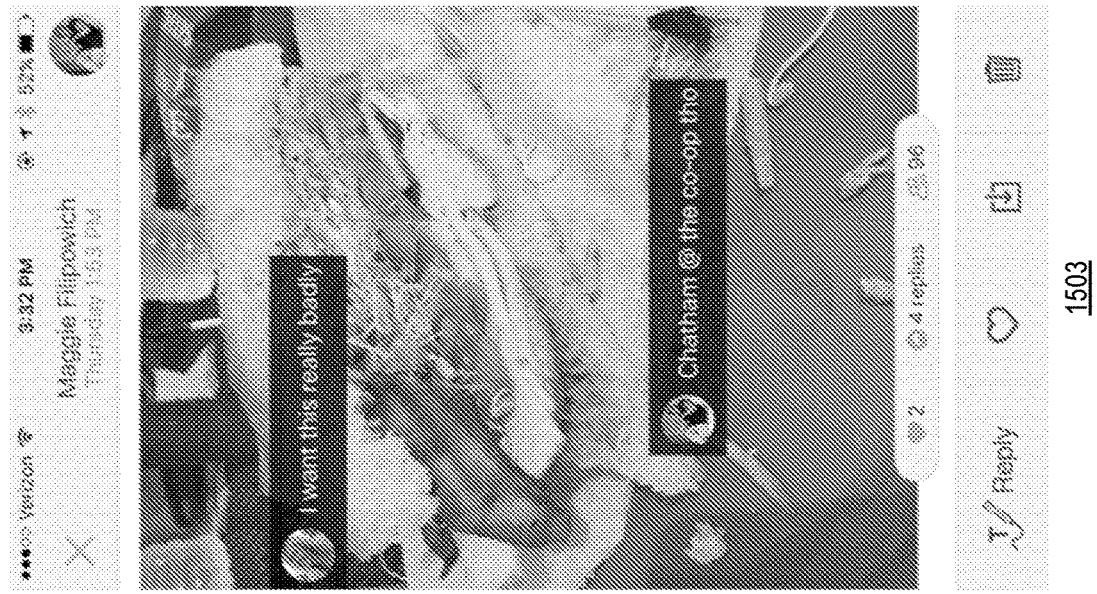
FIG. 15 are screenshots of a graphical user interface illustrating a restart sharing operation and comments superimposed to a published media file, according to an embodiment.
Figure 15:

FIG. 15 illustrates further implementations of a graphical user interface implemented via media mobile application 105 (shown in FIG. 1). For example, in some embodiments, when broadcast object is terminated, user is given option to automatically restart the broadcast object in a set amount of time as shown at 1501. Additionally, in some embodiments, a text reply on a photo appears as a new image with the previous text replies or drawn replies visible as shown at 1503.

Figure 16:
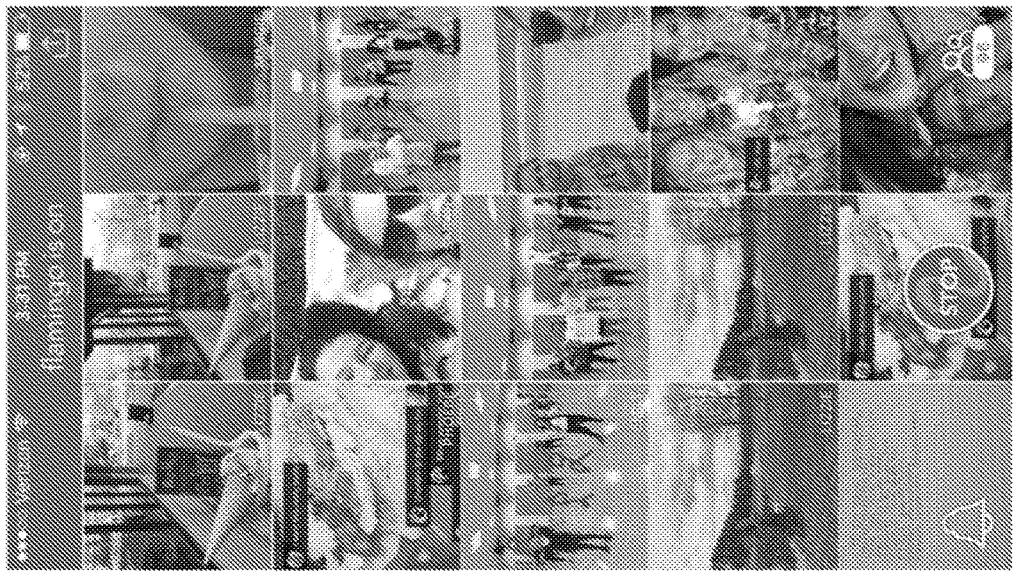
FIG. 16 are screenshots of a graphical user interface illustrating a handwritten reply to a published media file and a set of published media files, according to an embodiment.
Figure 16:
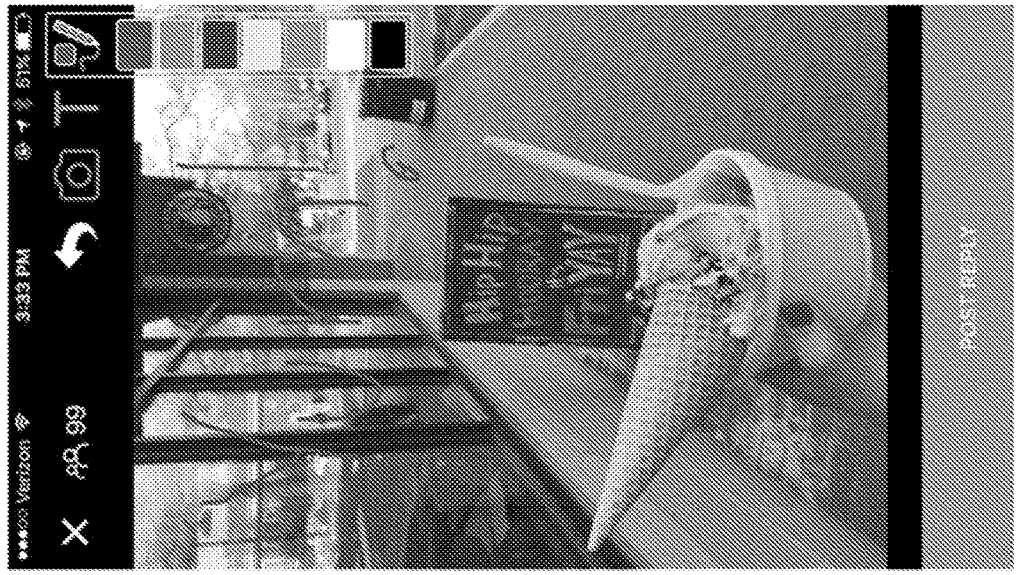

FIG. 16 illustrates further embodiments of the graphical user interface implemented via media mobile application 105 (shown in FIG. 1). In some instances, users can reply to broadcast content by adding a drawing, or text, and/or the like, which is then re-broadcast to the broadcast recipients with access to the original broadcast content as shown at 1601. Additionally, in some embodiments, when a reply is rebroadcasted, the broadcast recipients with access to the original broadcast content can see the new reply as an image in the feed as shown at 1603. In some embodiments, users can view lists of users who are viewing a live broadcast, and can include interfaces to allow host of a live broadcast to edit settings of the live broadcast. In some implementations, the live broadcast can be viewed and/or managed in a mobile application, a desktop web interface, and/or the like.

Figure 17:
FIG. 17 are screenshots of a graphical user interface illustrating controllers and prompts of a broadcast media application, according to an embodiment.
Figure 17:

FIG. 17 illustrates further embodiments of the graphical user interface implemented via media mobile application 105 (shown in FIG. 1). In some instances, the graphical user interface displays multiple controllers 1701 to perform operations on broadcasted media including allowing another user to see the broadcasted media (e.g. by inviting a user's personal contact), manually uploading a media file, manually enable or disable media auto-sharing setting, sorting the media, and other suitable controllers. In some instance, the graphical user interface notifies (e.g., 1703) the user when a media file has been broadcasted on for example, an event page. For instance, event page shown in FIG. 14.

FIG. 18 is a screenshot of a graphical user interface illustrating a media mobile application (or built-in camera application) of a mobile device. Media mobile application 106 can In some instances, when a user presses the button 1801 the media mobile application 106 executes a process to upload or send a captured media file (e.g., a picture, a video, or other suitable media file) to broadcast server 112 in real-time or substantially in real-time. Accordingly, broadcast mobile application 104 can, for example, implement an event-listener function configured to execute a computer function when a user clicks or presses the button 1801 to take a picture, and/or to end the recording of a video. Thus, the broadcast mobile application 104 causes the mobile device 102 to send a media file to broadcast server 112 in real-time or substantially in real-time when a user clicks the button 1801 of the media mobile application 106. In some implementations, the media mobile application 104 can be a native or built-in application of the mobile device 102, for instance an iPhone® build-in camera application, an Android® build-in camera application or other build-in media application of a compute device.

It is intended that the systems and methods described herein can be performed by software (stored in memory and/or executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including Unix utilities, C, C++, Java™, Ruby, SQL, SAS®, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

The invention claimed is:

1. An apparatus, comprising:
a processor; and
  a memory storing code which, when executed by the processor, causes the processor to:
    receive, from a plurality of compute devices, a set of media files and a set of geolocations, each media file from the set of media files captured by one of the plurality of compute devices and each geolocation from the set of geolocations associated with one of the plurality of compute devices;
    determine a geolocation radius of an event based on the set of geolocations;
    send a request message to a compute device from the plurality of compute devices when it is determined that the compute device is out of the geolocation radius of the event;
    receive, from the compute device, in response to the request message, at least one media file associated with the event; and
    broadcast the set of media files and the at least one media file associated with the event to the plurality of compute devices.

2. The apparatus of claim 1, wherein the geolocation radius of the event is a first geolocation radius, the set of media files is a first set of media files, and the set of geolocations is a first set of geolocations and the code to determine the geolocation radius of the event includes code to:
  receive, from the plurality of compute devices, a second set of media files and a second set of geolocations, each media file from the second set of media files captured by a compute device from the plurality of compute devices and each geolocation from the second set of geolocations associated with a compute device from the plurality of compute devices; and
  determine a second geolocation radius of the event based on the second set of geolocations, wherein the second geolocation radius does not overlap with the first geolocation radius.

3. The apparatus of claim 1, wherein the code to determine the geolocation radius of the event includes code to:
  compute a center point of an event based on the set of geolocations and a predetermined distance associated with the event.

4. The apparatus of claim 1, wherein the plurality of compute devices includes a set of mobile compute devices and the code to broadcast to the plurality of compute devices includes code to:
  send each media file from the set of media files to the set of mobile compute devices.

5. The apparatus of claim 1, wherein the code to broadcast to the plurality of compute devices includes code to:
  publish each media file from the set of media files on a webpage.

6. The apparatus of claim 1, wherein the event is associated with a scheduled time, the scheduled time includes a starting time and an ending time and the at least one media file associated with the event is received at a time between the starting time and the ending time.

7. The apparatus of claim 1, wherein the event is associated with a scheduled time, the scheduled time includes a starting time and an ending time and the at least one media file associated with the event is received at a time that is later than the ending time.

8. The apparatus of claim 1, wherein the at least one media file includes at least one of a picture, a video, and an audio file.

9. The apparatus of claim 1, wherein each of media file from the set of media files is broadcasted in substantially real-time based on a time at which each media file from the set of media files was received.

10. The apparatus of claim 1, wherein the at least one media file is broadcasted in substantially real-time based on a time at which the at least one media file was received.

11. A method for dynamic location-based media broadcasting, the method comprising:
  receiving, from a plurality of compute devices, a set of media files and a set of geolocations, each media file from the set of media files captured by one of the plurality of compute devices and each geolocation from the set of geolocations associated with one of the plurality of compute devices;
  determining a geolocation radius of an event based on the set of geolocations;
  sending a request message to a compute device from the plurality of compute devices when it is determined that the compute device is out of the geolocation radius of the event;
  receiving, from the compute device, in response to the request message, at least one media file associated with the event; and
  broadcasting the set of media files and the at least one media file associated with the event to the plurality of compute devices.

12. The method of claim 11, wherein the geolocation radius of the event is a first geolocation radius, the set of media files is a first set of media files, and the set of geolocations is a first set of geolocations, and wherein the method further comprises:
  receiving, from the plurality of compute devices, a second set of media files and a second set of geolocations, each media file from the second set of media files captured by a compute device from the plurality of compute devices and each geolocation from the second set of geolocations associated with a compute device from the plurality of compute devices; and
  determining a second geolocation radius of the event based on the second set of geolocations, wherein the second geolocation radius does not overlap with the first geolocation radius.

13. The method of claim 11, wherein determining the geolocation radius of the event comprises computing a center point of the event based on the set of geolocations and a predetermined distance associated with the event.

14. The method of claim 11, wherein the plurality of compute devices includes a set of mobile compute devices, and wherein broadcasting the set of media files and the at least one media file comprises sending each media file from the set of media files and the at least one media file to the set of mobile compute devices.

15. The method of claim 11, wherein broadcasting the set of media files and the at least one media file comprises publishing each media file from the set of media files and the at least one media file on a webpage.

16. The method of claim 11, wherein the event is associated with a scheduled time, the scheduled time includes a starting time and an ending time and the at least one media file associated with the event is received at a time between the starting time and the ending time.

17. The method of claim 11, wherein the event is associated with a scheduled time, the scheduled time includes a starting time and an ending time and the at least one media file associated with the event is received at a time that is later than the ending time.

18. The method of claim 11, wherein the at least one media file includes at least one of a picture, a video, and an audio file.

19. The method of claim 11, wherein each of media file from the set of media files is broadcasted in substantially real-time based on a time at which each media file from the set of media files was received.

20. The method of claim 11, wherein the at least one media file is broadcasted in substantially real-time based on a time at which the at least one media file was received.

* * * * *